United States Patent [19]
Beltz et al.

[11] 3,867,698
[45] Feb. 18, 1975

[54] TEST PROBE FOR INTEGRATED CIRCUIT CHIPS

[75] Inventors: Richard K. Beltz, Hamburg; Jerry C. Hurst, Reading, both of Pa.

[73] Assignee: Western Electric Company, Incorporated, New York, N.Y.

[22] Filed: Jan. 31, 1974

[21] Appl. No.: 438,318

Related U.S. Application Data
[62] Division of Ser. No. 337,043, March 1, 1973, Pat. No. 3,810,016.

[52] U.S. Cl. ............................. 324/158 P, 324/72.5
[51] Int. Cl. ......................... G01r 1/06, G01r 31/02
[58] Field of Search ............. 324/158 P, 158 F, 72.5

[56] References Cited
UNITED STATES PATENTS

| | | | |
|---|---|---|---|
| 3,613,001 | 10/1971 | Hostetter | 324/158 P |
| 3,702,439 | 11/1972 | McGahey et al. | 324/158 P |
| 3,810,016 | 5/1974 | Chayka et al. | 324/158 P |

*Primary Examiner*—Alfred E. Smith
*Assistant Examiner*—Ernest F. Karlsen
*Attorney, Agent, or Firm*—G. W. Houseweart

[57] ABSTRACT

A test probe for semiconductor chips is made, starting with a generally flat array of converging sets of leads, whose outer ends are attached to a frame via expansion elements and whose inner ends are attached to each other. In this lead array, there is formed a pyramidal protrusion consisting of the attached inner ends and the portions of the leads nearest thereto. Other lead portions are then embedded in the surface of a plastic frame. Next, the outer ends of the leads are severed from the expansion elements, and the inner ends are severed from each other. The outer lead ends constitute the contacts between the probe and associated external test equipment, while the pyramidally protruding inner lead ends constitute the probe fingers for contacting the semiconductor chips.

Preferably, a second protrusion, which provides a pedestal for pyramidal protrusion, is also formed in the lead array. In that case, lead portions forming the pedestal are also embedded in the plastic frame surface.

The lead displacements involved in forming the two protrusions are accompanied by compensating movements of the expansion elements, thereby preventing stretching of the leads themselves.

6 Claims, 8 Drawing Figures

TEST PROBE FOR INTEGRATED CIRCUIT CHIPS

This is a division, of application Ser. No. 337,043 filed Mar. 1, 1973, now U.S. Pat. No. 3,810,016.

BACKGROUND OF THE INVENTION

1. Field of the Invention

This invention relates to probe-testing of semiconductor devices. More particularly, it relates to an improved test probe and an improved process for making such a probe.

2. Description of the Prior Art

A known form of test probe for semiconductor devices, such as beam-leaded transistors or integrated circuit chips, is shown, viewed from below, in the solid-line portions of FIG. 1. This test probe 10, which is shown in greatly enlarged form in FIG. 1, includes a plastic frame 11 having a protruding annular portion 12 of rectangular configuration surrounding the central opening defined by the frame. Sets of converging leads 13 are embedded in the lower surface of frame 11. The inner ends of these leads extend in cantilevered fashion into the opening, and are bent to form downwardly protruding probe fingers 14. These probe fingers serve to contact the test points of the semiconductor chips (not shown in FIG. 1) which are to be probed. The outer ends of leads 13 protrude beyond the outer edge of frame 11 and serve to establish electrical contact with external test equipment (also not shown) with which the probe cooperates.

This general type of probe, and processes for making same, are disclosed in U.S. Pat. No. 3,810,016 in the names of G. A. Chayka, E. J. Persson and N. Ziobro, and assigned to the assignee of the present application.

As is more fully explained in that copending application, this type of probe is advantageous because the steps used to make it are simple and capable of being performed quickly and effortlessly, while still imparting to the resultant product the high precision required by the minuteness of the semiconductor chips to be probed.

Although this type of probe is therefore highly satisfactory for many applications, there are some circumstances in which it may not be suitable.

One of these circumstances involves the length of probe fingers 14.

These probe fingers are formed by a series of operations from the inner ends of leads 13, which are initially flat and attached to each other. This initial state is illustrated in FIG. 1, by means of broken lines, which show the inner ends of leads 13 while they are still flat and attached to each other by a web 13a. Probe fingers 14 are then formed, by first severing the inner ends of flat leads 13 from web 13a, and the bending the lead ends appropriately, usually to an inclination of approximately 75° relative to their original plane. In accordance with the prior art, portions of leads 13 adjacent to frame 11 are embedded in that frame, before the above-mentioned severing and bending takes place. Consequently, leads 13 are unable to move lengthwise during bending of their inner ends, and the lengths of probe fingers 14 are limited to the distance, measured in the plane of flat leads 13, by which the inner ends of those flat leads extend into the central opening defined by frame 11.

The reason why this restriction on probe finger length sometimes presents a problem appears from

2

Figure 2:
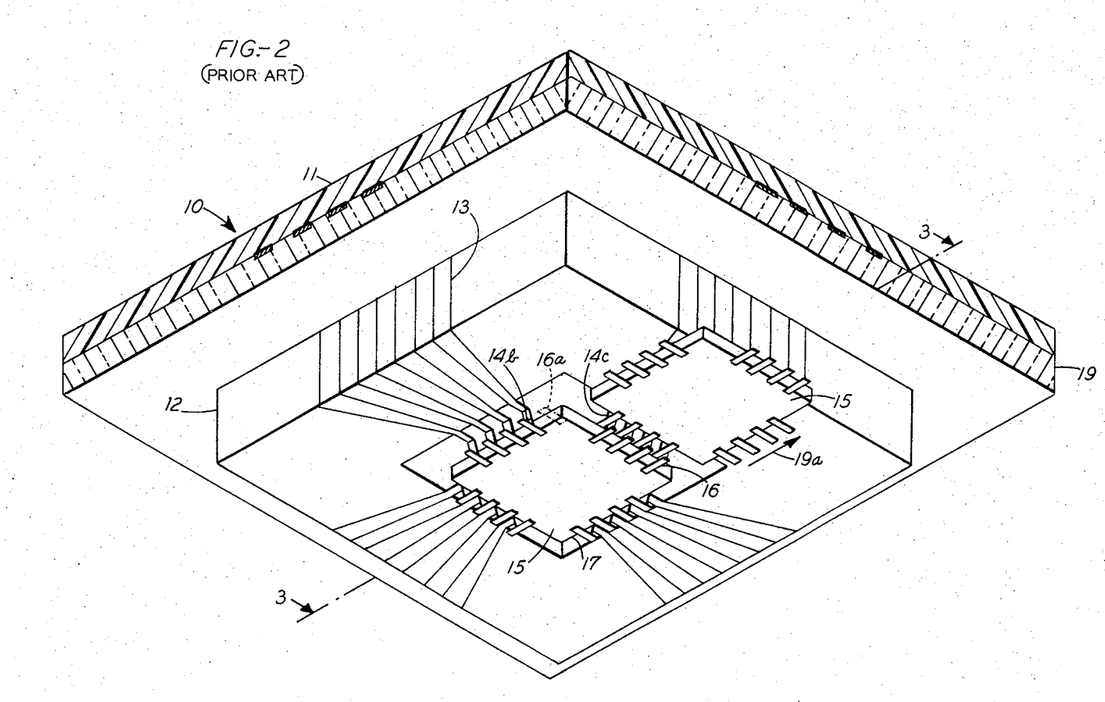
FIG. 2 is a still further enlargement of the middle portion of the prior art probe illustrated in FIG. 1, shown in position relative to semiconductor chips undergoing probing.
Figure 3:
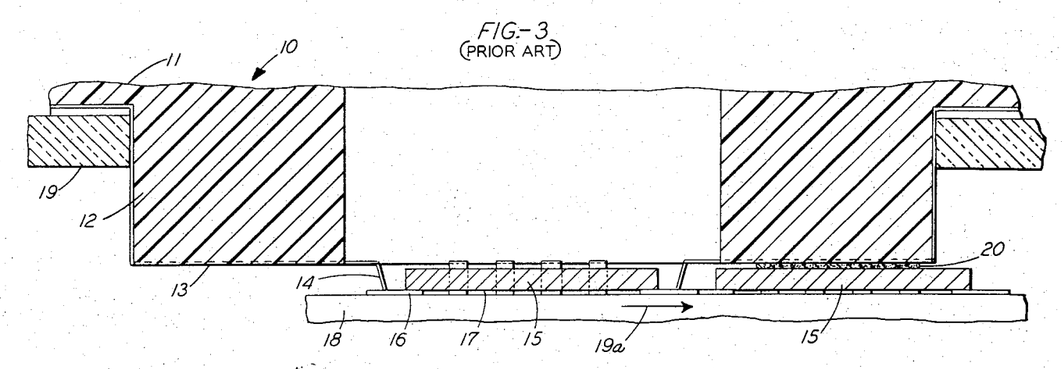
FIG. 3 is a section, still further enlarged, taken through FIG. 2.

FIGS. 2 and 3, both of which show the middle portion of probe 10, still further enlarged, and in position relative to typical semiconductor chips 15. In particular, FIG. 2 is an isometric view, taken from below, of the middle portion of probe 10, while FIG. 3 is an even further enlarged cross-section taken along 3—3 through FIG. 2. For convenience of illustration, only two chips 15 are shown in each of FIGS. 2 and 3. However, it will be understood that these chips normally form part of a much larger array of many, tightly grouped chips formed through conventional processing of semiconductor wafers. Chips 15 are shown as having beam leads 16, the confronting beam leads of adjacent chips being interdigitated to enable these chips to be arrayed as tightly as possible.

Such beam-leaded chips are customarily probed from the "back," i.e., with their beam leads 16 facing away from probe 10, as shown in FIGS. 2 and 3. Their semiconductor bodies 17 are therefore positioned between beam leads 16 and plastic frame 11 of probe 10. As shown in FIG. 3, these chips are normally supported from below during probing, by means of a suitable ceramic or glass substrate 18. This substrate has not been shown in FIG. 2, so as not to obscure the other elements visible in that figure, which are important to an understanding of the prior art.

Also shown in FIG. 2 is a portion of a printed circuit board 19. Such a board may be inserted beneath probe 10 to provide electrical connections between probe leads 13 and external test equipment (not shown). Board 19 nestles in the space defined by annular portion 12 of plastic frame 11. In order that different ones of chips 15 may be probed, in succession, these chips are displaced laterally, as indicated by arrow 19a in FIGS. 2 and 3, so that one chip at a time comes into a position in which its beam leads are contacted by probe fingers 14. Simultaneously, adjacent chips assume positions beneath plastic frame 11. If that frame, and printed circuit board 19 are to clear these adjacent chips, probe fingers 14 must extend below frame 11 by at least the thickness of the semiconductor body 17. Even greater clearance is required when ink dots are applied to those chips which are deemed unsatisfactory after probing, in order to distinguish them from those which are satisfactory. Such an ink dot 20 is visible in FIG. 3 on that one of chips 15 which is located, after probing, beneath annular portion 12 of frame 11. As shown in FIG. 3, unless probe fingers 14 are long enough to provide adequate clearance, ink dot 20 bridges the gap between the "back" of chip 15 and probe frame 11, thereby causing such adverse effects as short-circuiting of leads 13 embedded in the lower surface of the probe frame. These requirements for clearance thus tend to conflict with the limitation on the length of probe fingers 14 which is inherent in the construction of probe 10.

A second circumstance in which probe 10 may be unsuitable involves the specific locations of the chip test points (e.g., beam leads 16) which the probe fingers 14 are supposed to contact.

Figure 1:
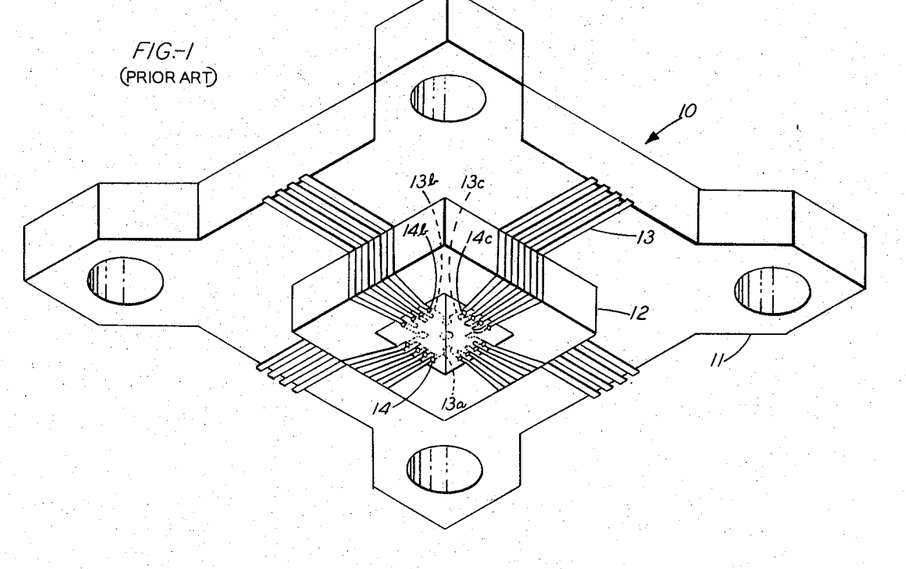
FIG. 1 is an isometric bottom view, greatly enlarged, of a prior art probe.

As shown in broken lines in FIG. 1, at that stage of making the prior art probe at which the inner ends of leads 13 are still flat, these ends can be positioned as close as desired to the corners of a rectangle, such as defined by the periphery of web 13a. From this it might be concluded that probe fingers 14, which are subsequently formed from these lead ends, are capable of contacting beam leads located at the corners of a semiconductor chip having the same general rectangular shape as web 13a. That, however, is not the case. The reason is as follows.

FIG. 1 shows that forming of probe fingers 14, through bending of the flat lead ends (which have previously been restrained from lengthwise movement by being embedded in frame 11), moves these fingers away from the middle, and toward the outer edges of the opening defined by frame 11. One consequence of this is an increase in the spacing between fingers which converge from different directions. This effect can be observed, for example, in probe fingers 14b and 14c which are the two fingers closest to a corner of the chip 15 being probed. Fingers 14b and 14c are formed from the inner end of flat leads 13b and 13c, shown in broken lines in FIG. 1. Leads 13b and 13c, while they are still flat, almost meet at a corner of web 13a. In contrast, the tips of probe fingers 14b and 14c formed from these same leads are spaced much farther from the corresponding corner of the rectangle defined by these finger tips.

Because of this increased tip spacing, neither probe finger 14b nor probe finger 14c is capable of contacting a beam lead, such as shown in phantom at 16a in FIG. 2, located at a corner of the chip 15 being probed. In the prior art, such chip corners therefore represented "forbidden" locations for beam leads.

SUMMARY OF THE INVENTION

It is therefore an object of the invention to provide a new and improved semiconductor test probe.

It is another object to provide a process for making such a new and improved semiconductor test probe which is free from these limitations.

It is another object to provide a test probe for semiconductor chips whose probe fingers can have any length which may be desired in practice.

It is another object to provide a test probe for beam-leaded semiconductor chips whose probe fingers are capable of contacting even beam leads extending from corners of the chips.

It is another object to provide a process for making a semiconductor test probe having one or both of the above-mentioned characteristics as to probe finger length and contact capability.

These, and other objects which will appear, are achieved by performing the probe making process in a different manner than heretofore, while preserving its advantages of ease, simplicity and high precision.

The process embodying the present invention starts with a generally flat array of converging sets of leads, whose outer ends are attached by expansion elements to a lead frame, and whose inner ends are attached to each other. A plastic frame is provided, but, before any leads are embedded in the frame surface, a pyramidal protrusion is formed in the lead array.

This protrusion includes the attached inner lead ends and the portions of the leads adjacent thereto. Preferably, a second protrusion, which provides a pedestal for the pyramidal protrusion, is also formed in the lead array. Only then are portions of the leads which do not form part of the pyramidal protrusion embedded in the surface of the plastic frame. Finally, the leads are severed from the expansion elements, and also from each other along the faces of the pyramidal protrusion. The result is a probe embodying the invention.

In forming the protrusions in the lead array, the required longitudinal lead displacements are absorbed through movements of the expansion elements, so that no appreciable stretching of the leads themselves takes place.

BRIEF DESCRIPTION OF THE DRAWINGS

For further details, reference may be had to the description which follows, and to the accompanying drawings, wherein.

The same reference numerals are used throughout the figures to denote similar elements.

DETAILED DESCRIPTION

As previously explained, under the heading "Description of the Prior Art," FIGS. 1, 2 and 3 show a probe embodying the prior art.

Figure 4:
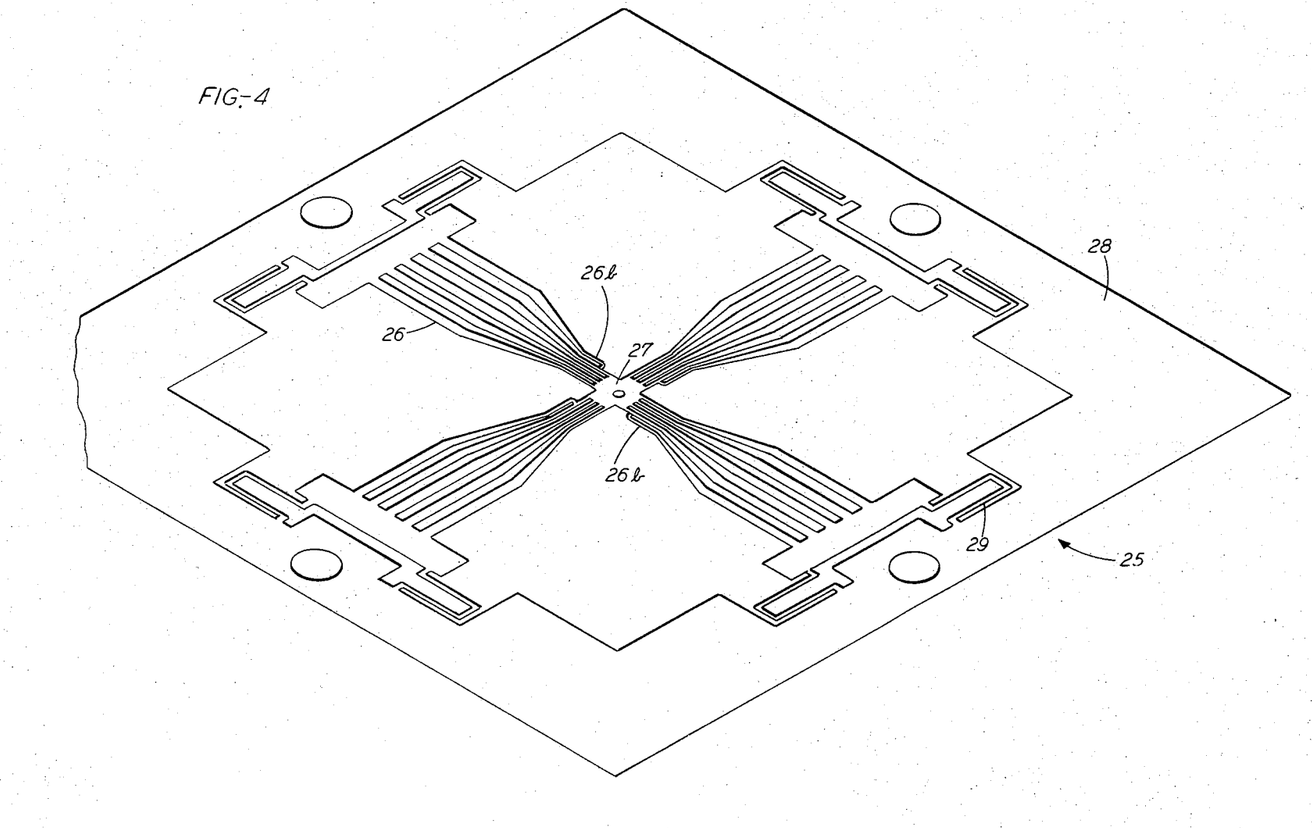
FIGS. 4 to 6 are isometric bottom views, also greatly enlarged, of various stages in forming a probe embodying the present invention.

Turning from the prior art to the present invention, reference may now be had to FIG. 4, which shows an early stage in the process embodying the invention. Specifically, FIG. 4 shows a lead array 25, as it is initially formed. This lead array, which may be substantially flat, comprises sets of leads 26 converging from four, mutually perpendicular directions. The inner ends of leads 26 are attached to each other, and to a central web 27. Their outer ends are attached to a frame 28 through expansion elements 29. Lead array 25 may be produced in any conventional manner, as, for example, by well-known photolithographic techniques.

Figure 5:
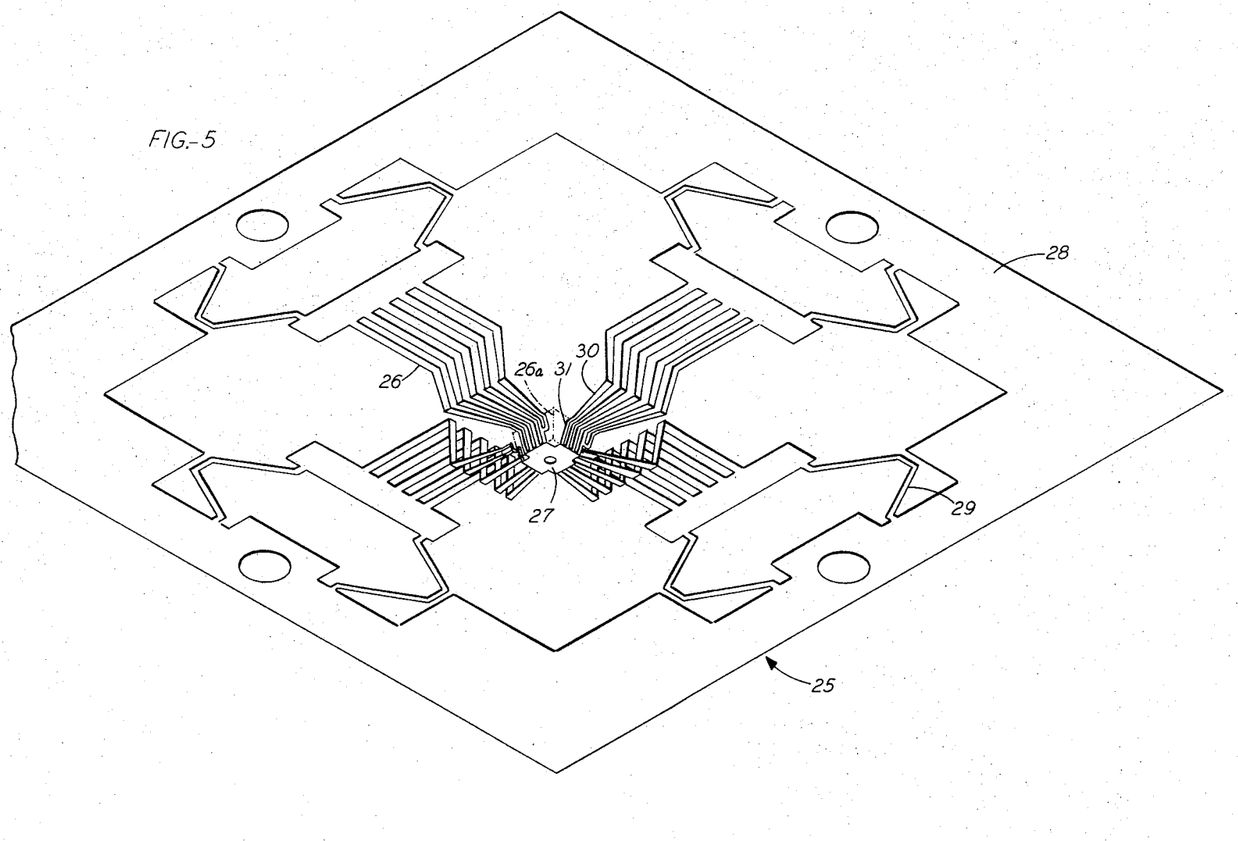

Lead array 25 is next subjected to a forming operation, to produce the protrusions shown in FIG. 5. These consist of a pedestal 30 formed of intermediate portions of leads 26, and a truncated pyramid 31, protruding from the middle of pedestal 30 and formed of web 27 and the inner ends of leads 26. Both pedestal 30 and pyramid 31 are formed by lengthwise displacements of leads 26. As shown in FIG. 5, these displacements are accompanied by movements of expansion elements 29, so that there is no appreciable stretching of leads 26, themselves, in the course of forming the protrusions. This forming operation may be carried out in any conventional manner as, for example, by means of an appropriately shaped conventional die set.

The pyramid-forming portion 26a of the male member of this die set is indicated in phantom in FIG. 5. Care should be taken that the leads being formed into pyramid 31 intersect none of the sloping edges of die portion 26a. In this way, buckling of leads 26 during pyramid forming is prevented. Absence of such intersections can readily be assured by appropriate shaping of leads 26 and web 27.

For reasons which are explained later, it may be desirable to provide, in each set of converging leads 26, one lead 26b, positioned to one side of its respective lead set. This brings lead 26b so close to the nearest sloping edge of the pyramid defined by the several lead sets that it would intersect that pyramid edge — and therefore also the sloping edge of die portion 26a which coincides with the same pyramid edge — if it were simply continued straight to web 27. Each of leads 26b is therefore preferably shaped like a "jug handle" and attached to its respective adjoining lead, as shown in FIGS. 4 and 5.

Figure 6:
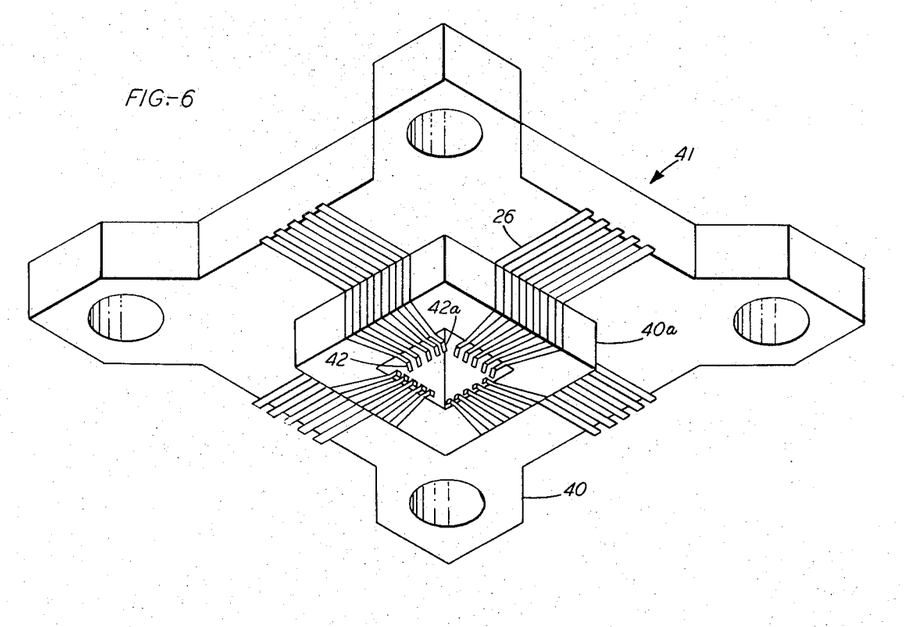

The next step in the process embodying the invention involves attaching lead array 25, with its pedestal 30 and pyramid 31, to an insulating supporting frame 40, as shown in FIG. 6.

Frame 40 is preferably molded or plastic and has one surface shaped in an annular protrusion 40a conforming to pedestal 30 previously formed in lead array 25. The frame dimensions are such as to leave free pyramid 31 and preferably also a portion of the top of pedestal 30 surrounding the pyramid. Frame 40 also leaves free lead frame 28 and expansion elements 29.

The material of which frame 40 is made is preferably thermoplastic. Leads 26 can then be readily attached by pressing these leads into frame 40 until they are embedded flush in the surface of the frame, while heating the frame sufficiently to yield to such surface embedding. This operation is entirely conventional and therefore needs no further description.

In order that leads 26 may be firmly retained within frame 40, even though they are flush with its surface, these leads may be given a cross-section which is wider at the middle than at the top and at the bottom. During embedding, the plastic material of frame 40 will then flow around these wider middle portions, thereby trapping leads 26 more securely in the plastic.

FIG. 6 shows not only leads 26 embedded in frame 40, but the entire, completed probe 41 embodying the invention. It will be observed that in forming this completed probe, outer lead frame 28 and expansion elements 29 have been removed and the inner lead ends have been separated. This may be done, in conventional manner, after leads 26 have been attached to frame 40 as previously explained. Lead frame 28 and expansion elements 29 may be severed by a conventional punching operation. The inner lead ends are preferably separated by severing leads 26 in a plane parallel to the plane defined by the undeformed portions of lead array 25, and far enough up along the faces of pyramid 31 to form separated probe fingers 42 of the desired lengths. Such severing may be accomplished in any conventional manner, as by sliding a knife blade (not shown) inwardly toward the center of pyramid 31 at the appropriate level of the pyramid faces. Support for such a sliding blade may be provided by the outer surface of the female portion (not shown) of the die set used in forming pyramid 31; backing for the sloping leads 26, during severing, may be provided by die portion 26a (FIG. 5) of the same die set.

The fingers 42 formed by such severing of leads 26 should have exceptionally flat and smooth tips, so that they will not damage the semiconductor beam leads on which they rest during probing. To this end, these tips may be lapped to impart to them the desired degree of flatness and smoothness.

Figure 7:
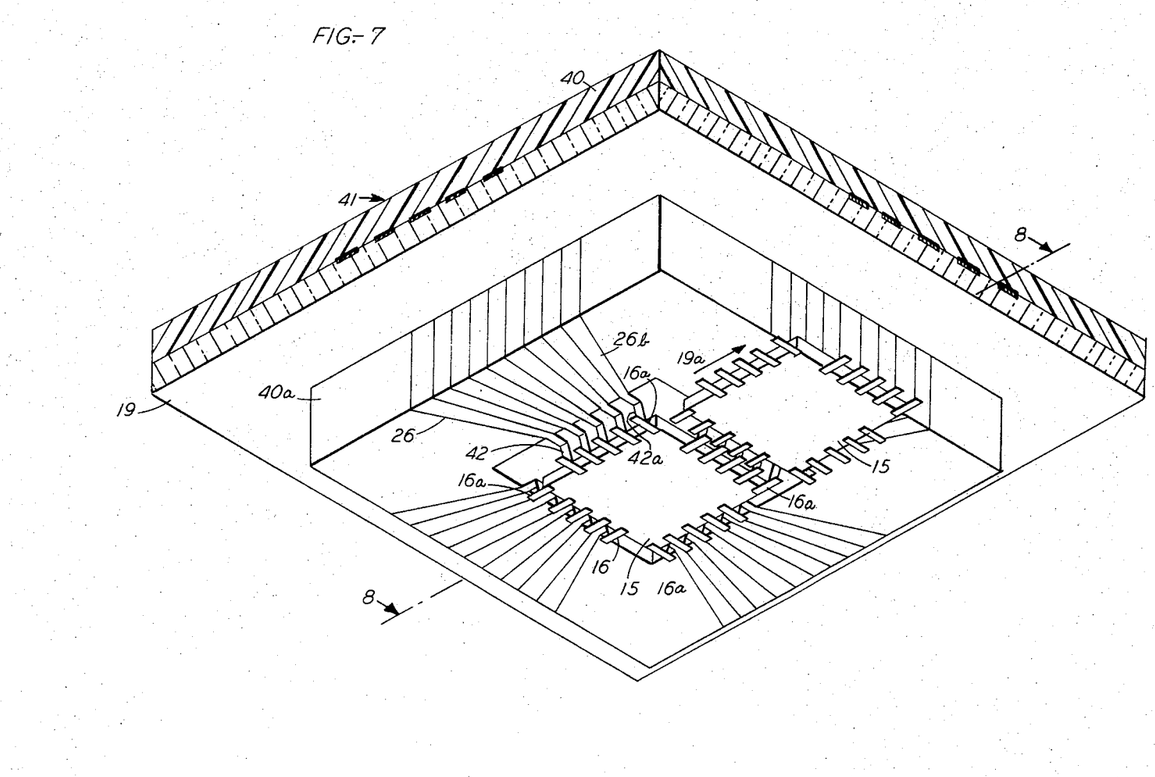
FIG. 7 is a still further enlargement of the middle portion of the probe of FIG. 6, shown in position relative to semiconductor chips undergoing probing.
Figure 8:
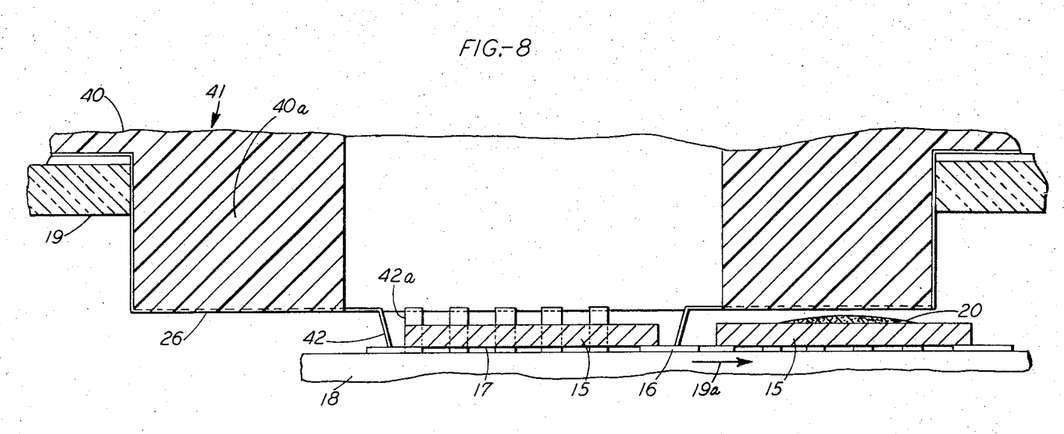
FIG. 8 is a section, still further enlarged, taken through FIG. 7.

FIG. 7 shows the middle portion, further enlarged, of the completed probe 41 of FIG. 6, and FIG. 8 shows an even further enlarged cross-section taken along 8—8 through FIG. 7. This probe portion is shown in both FIGS. 7 and 8 in the position which it typically occupies relative to semiconductor chips 15. Again only two chips are shown, for convenience of illustration.

As shown in FIGS. 7 and 8, probe 41 embodying the present invention has probe fingers 42 which are long enough to provide clearance for semiconductor chips 15, even when, as shown in FIG. 8, an ink dot 20 is placed on the back of a chip.

As also shown in FIGS. 7 and 8, probe 41 embodying the invention has probe fingers 42a capable of contacting beam leads 16a protruding from the corners of chips 15.

Long probe fingers are available because these fingers are formed (by formation of pyramid 31) while the leads 26 have not yet been embedded in frame 40, and are therefore still free to move lengthwise. As appears from FIG. 5, pyramid 31 can be extended to virtually any desired height by such lengthwise displacement during formation of pyramid 31, and fingers 42 can correspondingly reach virtually any length.

It will be understood that lead array 25 must initially be proportioned to permit formation of the desired pyramid 31. In particular, expansion elements 29 must be of such shape and size as to accommodate the required lengthwise lead displacements.

Probe fingers capable of contacting corner beam leads are available because there is no change in spacing between converging lead ends as these are formed into probe fingers in accordance with the present invention.

It will be recalled that probe fingers 42 (including fingers 42a which contact corner beam leads 16a) are formed by reshaping flat leads 26 of FIG. 4 into pyramid 31 of FIG. 5. This reshaping takes place while the inner ends of the leads are still attached to each other and free to move lengthwise. Therefore, the inner lead ends do not move away from the middle of the opening defined by frame 40, even though leads 26 are also being bent, and there is not the unavoidable increase in spacing between the ends of leads converging from different direction which characterizes the formation of prior art probe 10. Instead, the inner lead end spacings of FIG. 4 are substantially preserved in FIG. 5.

After pyramid 31 of FIG. 5 has been formed, all of leads 26, including leads 26b are severed to form the probe fingers. At that stage, the particular fingers 42a corresponding to leads 26b can still be just as close to the corners of the rectangle defined by these fingers as the corresponding lead ends had been before pyramid 31 was formed. By initially positioning leads 26b far enough to the side of the respective sets of leads 26, probe fingers 42a will end closely enough to these corners to contact beam leads 16a positioned at the corners of chip 15 being probed.

A jug-handle lead 26b is provided at only one side of each set of converging leads 26 in FIGS. 4 and 5 because, normally, a beam lead 16a will protrude from any given corner of a chip 15 in only one of the two possible orthogonal directions. Therefore, one probe finger 42a per chip corner suffices to contact all the corner beam leads 16a. If, for any reason, beam leads were to protrude in both orthogonal directions from the chip corners, then corresponding additional leads 26b could be provided, on the opposite sides of the respective sets of converging leads 26.

It should be noted that it is not the jug-handle shape of leads 26b which imparts to the probe made in accordance with the present invention its distinctive ability to contact corner beam leads 16a. Rather, it is the particular treatment given to these leads, and especially the forming of pyramid 31 while the leads are still attached to each other and free to move lengthwise, which imparts to the present probe its distinctive properties.

As previously explained, there are conspicuous differences between the functional capabilities of probe 41 embodying the present invention, and probe 10 embodying the prior art. On the other hand, the physical differences between these probes and between the respective methods of making them are rather subtle, and hard to visualize because of their intricate, three-dimensional character.

It therefore appears in order to briefly recapitulate these physical differences and their impact on probe function.

In both cases, the probe fingers can be regarded as defining a pyramid protruding from the surface of the plastic frame, and, in both cases, this protrusion is formed from the inner lead ends which extend cantilevered into the central opening defined by the frame.

However, in probe 41 this protrusion is formed by lengthwise displacement of leads 26 before they are restrained be being embedded in plastic frame 40. Therefore the leads forming that protrusion can be longer than if they had been formed, as they are in probe 10, by simply bending leads 13 which had previously been restrained from lengthwise movement by being embedded in the plastic frame.

Likewise, due to the formation of the pyramidal protrusion in probe 41 by lengthwise displacement of leads 26, the outermost lead or leads in any given set can end closer to the sloping edge of the pyramid defined by these leads than in probe 10, in which the protrusion is formed by only bending leads 13, but without lengthwise displacement thereof. Therefore, probe fingers 42 of probe 41 can terminate closer to the corners of the chips being probed than can probe fingers 14 of probe 10.

Various modifications in the probe embodying the present invention and in the process of making some will occur to those skilled in the art, without departing from the inventive concept.

For example, the numbers and positions of probe fingers 42 can be varied by appropriate design of lead array 25 in relation to the ultimately desired probe configuration.

Pedestal 30 may be omitted under certain circumstances. As previously indicated in connection with FIGS. 2 and 3, this pedestal defines a space for receiving a printed-circuit board 19 (see FIGS. 7 and 8), which interconnects the probe leads with other test equipment, without thereby reducing the clearance between the probe and the chips being probed.

Alternatively, these electrical connections could be made by soldering individual connecting wires directly to the outer ends of leads 26. No space for a printed-circuit board would then be needed, and neither would pedestal 30. In that case, it would also not be necessary to form the protruding portion 40a of plastic frame 40.

Also, while the invention has been described with respect to rectangular semiconductor chips, it will be understood that it is not so limited, and that probes for chips of other configurations may be readily provided. This may be accomplished be positioning the sets of leads forming the initial flat lead array in the appropriately converging configuration, and then forming the appropriate protrusions in the array, in accordance with the principles hereinbefore set forth.

What is claimed is:

1. In an electrical test probe comprising:
    an annular frame of thermoplastic material, said frame having opposing surfaces generally parallel to the plane defined by said frame, and
    groups of electrical leads extending from the outer edge of said frame toward the inner edge along only one of said opposing surfaces, and having tip ends projecting in cantilevered fashion into the open center of the frame, each said projecting lead end having a bend therein such that the portion closest to the tip end of each lead is inclined away from said plastic frame,
    different ones of said lead groups being disposed around the periphery of said frame at approximately integral multiples of ninety degrees from each other, and
    segments of all said leads being embedded in the one surface such that the embedded portions of the segments are contiguous with and retained by the thermoplastic material at and adjacent to said one surface, the improvement being that:
    the tip ends of the leads collectively form a pyramidal protrusion from said one surface, said protrusion having been formed by bending and concomitant lengthwise displacement of said leads prior to said lead embedding so that said tip ends forming said pyramidal protrusion are longer than if said protrusion had been formed by bending of said cantilevered leads after said lead embedding.

2. The probe of claim 1, further characterized in that at least one of said lead portions forming said pyramidal protrusion terminates closer to an edge of the pyramid defined by said protrusion than if said protrusion had been formed by bending of said cantilevered leads after said lead embedding.

3. A probe as recited in claim 1 wherein each of the leads have a nonconstant cross-section which is wider at the middle than at least one of the top and bottom surfaces thereof.

4. A probe as recited in claim 1 wherein one surface has two generally concentric levels and the inner concentric level protrudes relative to the outer concentric level in a direction away from the surface opposite said one surface.

5. A probe as recited in claim 4 wherein the leads are embedded in said one surface at both of said levels.

6. A probe as recited in claim 5 wherein the ends of the cantilevered portions of the probes are flat and in a plane substantially parallel to a plane defined by the inner level of said one surface.

* * * * *